United States Patent
Lebouill (10) Patent No.: US 7,360,078 B1
(45) Date of Patent: Apr. 15, 2008

(54) COMMUNICATION METHODS AND APPARATUS

(75) Inventor: Gilles Lebouill, Paris (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 883 days.

(21) Appl. No.: 10/019,788

(22) PCT Filed: Jul. 3, 2000

(86) PCT No.: PCT/IB00/00968

§ 371 (c)(1),
(2), (4) Date: Jan. 4, 2002

(87) PCT Pub. No.: WO01/03421

PCT Pub. Date: Jan. 11, 2001

(30) Foreign Application Priority Data

Jul. 5, 1999 (EP) .................................. 99401680
Jul. 23, 1999 (EP) .................................. 99401889

(51) Int. Cl.
*H04L 9/00* (2006.01)

(52) U.S. Cl. ................. 713/155; 713/161; 713/168; 713/172; 713/185; 726/2; 726/12; 709/224; 709/229

(58) Field of Classification Search ............. 713/155, 713/161, 168, 172, 185, 2, 12; 709/229, 709/224; 386/116; 725/82; 726/2, 12, 155, 726/161; 705/30
See application file for complete search history.

(56) References Cited

U.S. PATENT DOCUMENTS

| | | | | |
|---|---|---|---|---|
| 5,884,284 A | * | 3/1999 | Peters et al. ................. | 705/30 |
| 5,940,074 A | * | 8/1999 | Britt et al. ................... | 715/749 |
| 5,974,461 A | * | 10/1999 | Goldman et al. ........... | 709/224 |
| 5,978,381 A | * | 11/1999 | Perlman et al. ............. | 370/432 |
| 5,983,273 A | * | 11/1999 | White et al. ................. | 709/229 |
| 6,076,164 A | * | 6/2000 | Tanaka et al. .............. | 713/185 |
| 6,301,661 B1 | * | 10/2001 | Shambroom ................ | 713/168 |
| 6,385,651 B2 | * | 5/2002 | Dancs et al. ................ | 709/227 |
| 6,446,117 B1 | * | 9/2002 | Gebauer ..................... | 709/217 |
| 6,459,427 B1 | * | 10/2002 | Mao et al. ................... | 725/109 |
| 6,530,085 B1 | * | 3/2003 | Perlman ..................... | 725/82 |
| 6,788,882 B1 | * | 9/2004 | Geer et al. .................. | 386/116 |

FOREIGN PATENT DOCUMENTS

| | | |
|---|---|---|
| WO | WO 98/43427 | 10/1998 |
| WO | WO 98/50862 | 11/1998 |
| WO | WO 98/56188 | 12/1998 |

OTHER PUBLICATIONS

IEEE Paper XP-002061359, William E. Wall. *An Advanced Video Platform for the Cable Industry*, 1997, pp. 31-33.

* cited by examiner

*Primary Examiner*—Kim Vu
*Assistant Examiner*—Baotran N. To
(74) *Attorney, Agent, or Firm*—Osha Liang LLP (57) ABSTRACT

A method of authenticating communication between a receiver/decoder and a remote server is disclosed. The method involves using an identifier of the receiver/decoder to authenticate the communication, the identifier being based on a smartcard number. Also disclosed is a gateway which is adapted to receive data from a receiver/decoder, which data are not in internet protocol, and to convert said data into internet protocol for transmission to an internet service provider.

22 Claims, 7 Drawing Sheets

COMMUNICATION METHODS AND APPARATUS

BACKGROUND OF THE INVENTION

The present invention relates to methods and apparatus for communication between a user unit, such as a receiver/decoder, and a remote unit, which may be, for example, an internet account management system or an internet service provider.

Receiver/decoders are used for receiving and/or decoding signals, such as television signals, which may be transmitted in analogue or digital form. In the case of digital transmission, digital channels are encoded into a digital data stream at the transmitter end, and are decoded at the receiver end using a receiver/decoder, which may be either in a digital set-top box (DSTB) or in an integrated digital television. In the case of analogue transmission, a receiver/decoder may be provided at the subscriber to convert the transmitted signals into a format that may be displayed on a television screen.

Receiver/decoders typically contain a processor on which programs known as applications may be run. An example of an application which may be run on a receiver/decoder is an internet access application, which can allow a subscriber to access the internet by means of the receiver/decoder.

Receiver/decoders tend to be of relatively simple construction in order to ensure a low unit cost. This can make it difficult to set up a receiver/decoder to communicate with a remote network, such as the internet. In particular, communication with the internet requires the use of internet protocols and authentication which may be difficult to implement on a receiver/decoder. For example, certain receiver/decoders may not be able to output data in a format suitable for direct connection to the internet. Such receiver/decoders are referred to as "non-IP enabled".

SUMMARY OF THE INVENTION

A first aspect of the present invention provides a method of authenticating communication between a receiver/decoder and a remote server for providing access to a network, the method comprising using an identifier of the receiver/decoder to authenticate the communication, the identifier being based on an identifier for access to broadcast services.

By use of the invention, authentication of the communication between the receiver/decoder and the remote server can be based on a unique identifier of the receiver/decoder to which the receiver/decoder has ready access, which can reduce the requirements made of the receiver/decoder. Receiver/decoders are often provided with a unique identifier for access to broadcast services, which identifier provides a convenient means of identifying the receiver/decoder.

Preferably the identifier is stored on a removable component, such as a smartcard.

Preferably the identifier is independent of a network login identifier. This can reduce the complexity of the receiver/decoder, since the identifier may be simpler than a network login identifier, which tend to be complex multicharacter identifiers, to facilitate memorising by a user. Another drawback with login identifiers is that they may change from time to time, or more than one may be required for access to different services; the invention may allow a single identifier supplied by a receiver/decoder to be associated (in a remote server) with a changeable network identifier or with a plurality of network identifiers. This feature may be provided independently.

Preferably the identifier is based on a number unique to a smartcard. As used herein, the term "smartcard" includes, but not exclusively so, any chip-based card device, or object of similar function and performance, possessing, for example, microprocessor and/or memory storage. Included in this term are devices having alternative physical forms to a card, for example key-shaped devices such as are often used in TV decoder systems.

The remote server may be for accessing the internet, or it may be an internet account management system, or any other form of server, for example, for accessing a remote network of any form.

An internet account for a user may be established by an internet account management system using the identifier of the receiver/decoder. To establish the account, the identifier of the receive/decoder may be compared by the internet account management system with a stored list of identifiers of receiver/decoders which may establish internet accounts.

The remote server may comprise means for sending data to an internet service provider, the method comprising the steps of providing details of the internet account to the internet service provider to establish a bi-directional data pathway between the receiver/decoder and the internet service provider.

The identifier may be accompanied by data identifying a data pathway to be used for communication between the receiver/decoder and the remote server. In this way the receiver/decoder can specify the pathway to be used for communication; for example a satellite link may be used for the return channel.

In a preferred embodiment, the login details are in the form:

login = {smartcard number} {type of services} where the type of services (TOS) may specify the channels over which data communication is to occur, for example, the case where a category of responses are to be sent to the terminal by satellite.

In a preferred embodiment, the remote server provides the receiver/decoder with access to a network having network protocols, and data output from the receiver/decoder is converted into data compliant with the network protocols at a location remote from the receiver/decoder. In this way, a receiver/decoder which is not equipped with the network protocols may still communicate with the network. The network may be, for example, the internet, and the network protocol may be, for example, transport control protocol/internet protocol (TCP/IP). The remote location may be, for example, at an operator, which may comprise an internet account management system.

Preferably, the data is converted into said data compliant with the network protocols by a gateway intermediate the receiver/decoder and the remote server.

In a preferred embodiment, the network comprises a plurality of remote devices, said converted data being communicated by the gateway to one of said remote devices as specified in said data thereby establishing a communication channel between the receiver/decoder and the specified remote device.

In a second aspect, the present invention provides a method of communicating data from a non-internet protocol enabled user terminal to one of a plurality of internet protocol enabled remote devices, the method comprising the steps of communicating data using said non-internet protocol from said user terminal to said gateway, said data including a message and specifying a destination for said message from said plurality of remote devices, converting at said gateway said data into data using said internet protocol, and communicating said data using said internet protocol from said gateway to the specified destination remote device, thereby establishing a communication channel between the user terminal and the specified remote device. The user terminal may be a receiver/decoder.

Also provided is a method of communicating between a receiver/decoder and a remote network wherein the protocols necessary for communicating with the remote network are implemented at a remote location from the receiver/decoder.

A message instructing termination of the communication channel may be communicated from the receiver/decoder to the gateway using the non-internet protocol, the gateway in turn communicating a termination command to the specified remote device using the internet protocol. Preferably, the identification of the receiver/decoder is authenticated by the gateway before the communication channel is established.

In a third aspect, the present invention provides apparatus for authenticating communication between a receiver/decoder and a remote server for providing access to a network, the apparatus comprising means (for example, a system, server or gateway) for using an identifier of the receiver/decoder to authenticate the communication, the identifier being based on an identifier for access to broadcast services. The identifier may be accompanied by data identifying a data pathway to be used for communication between the receiver/decoder and the remote server.

The remote server may provide the receiver/decoder with access to a network having network protocols, said apparatus comprising means (for example, a system, server or gateway) for converting data output from the receiver/decoder into data compliant with the network protocols.

Preferably the apparatus is a gateway intermediate the receiver/decoder and the remote server.

Preferably the network comprises a plurality of remote devices, said gateway being adapted to communicate the converted data to one of said remote devices as specified in said data thereby establishing a communication channel between the receiver/decoder and the specified remote device.

In a fourth aspect, the present invention provides a gateway for communicating data received from a non-internet protocol enabled user terminal to one of a plurality of internet protocol enabled remote devices, the gateway comprising:

means (for example, an input) for receiving data communicated using said non-internet protocol from said user terminal, said data including a message and specifying a destination for said message from said plurality of remote devices; and means (for example, a converter) for converting the received data into data using said internet protocol; and means (for example, an output) for communicating said data using said internet protocol to the specified destination remote device, thereby establishing a communication channel between the user terminal and the specified remote device.

The gateway may comprise a plurality of input/output ports each for connection to a respective remote device.

The gateway may comprise means (for example, an identifier) for identifying a message from the user terminal instructing termination of the communication channel; and means (for example, an output) for passing a termination command to the specified remote device.

The invention also provides a method and apparatus substantially as described with reference to and as illustrated in the accompanying drawings.

Features of one aspect may be applied to other aspects; similarly, method features may be applied to apparatus aspects and vice versa.

BRIEF DESCRIPTION OF THE DRAWINGS

Preferred features of the present invention will now be described, purely by way of example, with reference to the accompanying drawings, in which: —

DETAILED DESCRIPTION OF THE INVENTION

Figure 1:
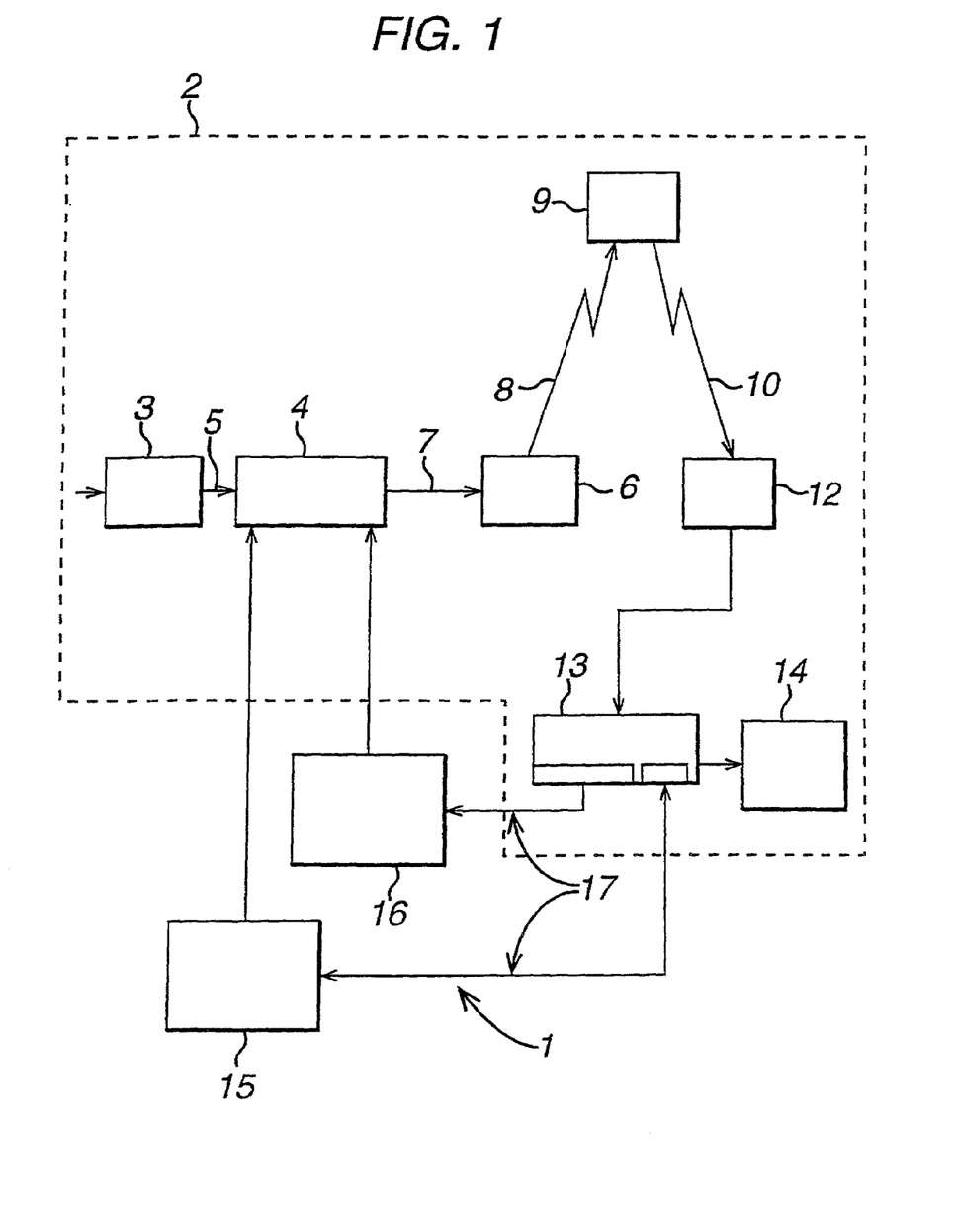
FIG. 1 shows the architecture of a typical digital television system.

An overview of a digital television system 1 is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. Other transport channels for transmission of the data are of course possible, such as terrestrial broadcast, cable transmission, combined satellite/cable links, telephone networks etc.

The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14. Although a separate receiver/decoder is shown in FIG. 1, the receiver/decoder may also be part of an integrated digital television.

As used herein, the term "receiver/decoder" includes a separate receiver/decoder, such as a set-top box, and a television having a receiver/decoder integrated therewith.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the receiver/decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the receiver/decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the receiver/decoder 13 having access to an equivalent to the exploitation key stored on a smart card inserted in the receiver/decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the receiver/decoder, enables the end user to interact with various applications via a modemed back channel 17. The modemed back channel may also be used for communications used in the conditional access system 15.

Figure 2:
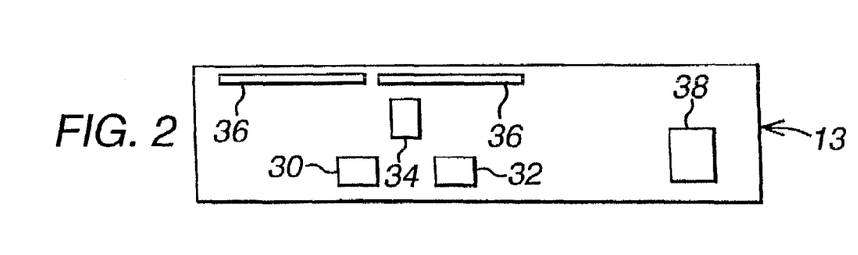
FIG. 2 is a schematic diagram of a receiver/decoder.

Physical interfaces of the receiver/decoder 13 are used for downloading data. With reference to FIG. 2, the receiver/decoder 13 contains, for example, six downloading devices; serial interface 30, parallel interface 32, modem 34, two card readers 36, and MPEG flow tuner 38.

The broadcast and reception system is also used to provide internet services such as web browsing and e-mail. An application which is run by the receiver/decoder 13 enables the receiver/decoder to access internet services and to display web pages and e-mails either on television set 14 or via a computer connected to the receiver/decoder 13.

Figure 3:
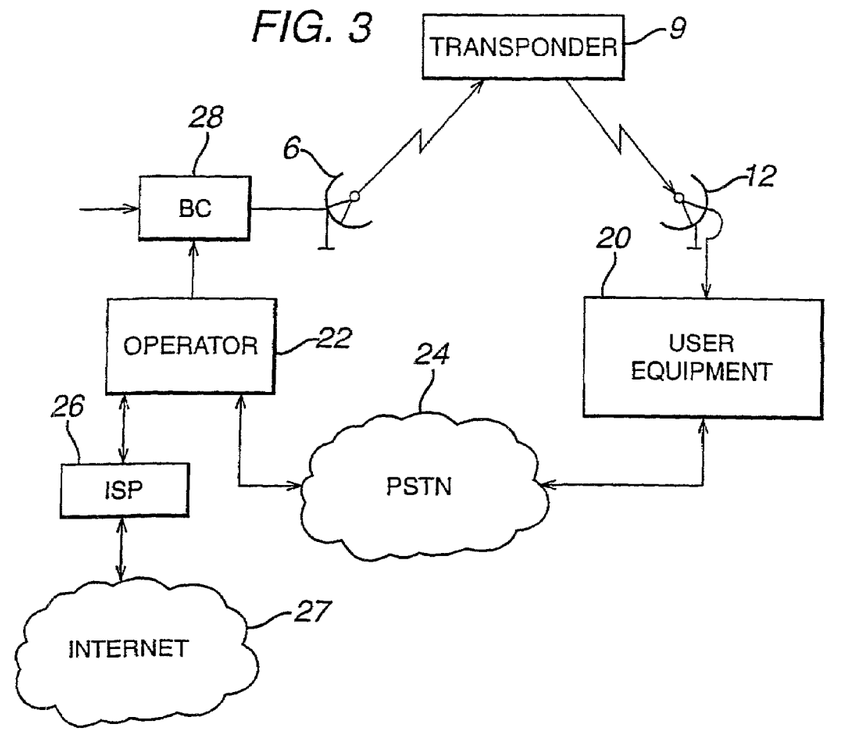
FIG. 3 shows an overview of an internet access system.

Referring to FIG. 3, an overview of the internet access system will be described. User equipment 20 (which includes a receiver/decoder) communicates with operator 22 via the public switched telephone network (PSTN) 24. The user equipment sends a request to the operator 22 to be sent certain data, for example, a particular web page or e-mail. The operator receives this request and outputs the request to internet service provider (ISP) 26. In response to this request, the ISP supplies a response to the operator, which might comprise a requested web page obtained from the internet 27, or an e-mail which was waiting for the subscriber at the ISP. The operator delivers the response to the broadcast centre 28, where it is integrated into the MPEG bitstream, for example as a private section, and transmitted by the transmitter 6 and received by receiver 12 as previously described. Where the receiver/decoder is IP-enabled, i.e. equipped with the protocols for receiving data from the internet, the information may be transmitted as an IP frame in the MPEG bitstream, that is, in the IP format. If the receiver/decoder is not IP-enabled then the data is sent in some other way, e.g. as a private MPEG section. The user equipment 20 extracts the response from the MPEG bitstream and displays it on a television set or on a computer screen. The response may alternatively be transmitted to user equipment 20 via the PSTN 24.

Figure 4:
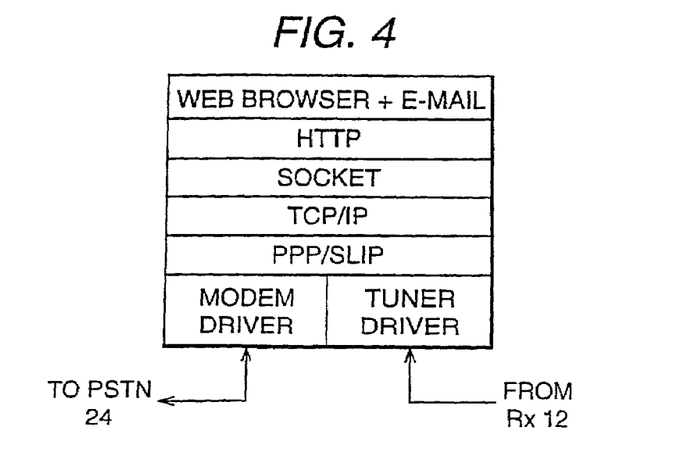
FIG. 4 illustrates software layers in the user equipment of FIG. 3.

The software levels employed in the user equipment 20 are shown in FIG. 4. The application level comprises a web browser and e-mail application, which may be a commercial application such as Netscape or Microsoft Internet Explorer and Outlook Express, or an application specifically designed to run on a receiver/decoder. Below the application level are HTTP, socket, TCP/IP, PPP/SLIP and a driver level. The driver level is modified, as compared with a browser application running traditionally on a PC, in that it is divided into a modem driver for communicating with the PSTN 24 via the modem of the user equipment and a tuner driver for communicating via the MPEG flow tuner 4028.

Various configurations of the user equipment 20 are possible. In one configuration a PC is not used and all of the user software runs on the receiver/decoder 13. In this configuration the receiver/decoder 13 communicates with the PSTN 24 either via an internal modem or via an external modem and the serial port. The receiver/decoder 13 can receive Internet responses in the bitstream from the earth receiver 12. The user interface is provided by a remote controller or keyboard and a television set connected to the receiver/decoder 13. In this configuration, the TCP/IP level shown in FIG. 4 may be omitted, in which case a gateway located at the operator provides the necessary protocols, as will be described later.

In another configuration a personal computer (PC) is provided which is connected by its parallel port to the parallel port 32 of the receiver/decoder 13 (or optionally by its serial port to the serial port 30 of the receiver/decoder 13). In this case, an upper portion of the software levels shown in FIG. 4 run on the PC, and the remaining lower portion of the software levels run on the receiver/decoder 13. The user interface is provided by a keyboard and a monitor connected to the PC.

In a further configuration a PC is connected to the PSTN 24 via an internal or external modem of the PC. In this configuration, the receiver/decoder 13 may be provided separately or in the form of an add-on or plug-in card of the PC, connected to the ISA or PCI bus thereof.

Figure 5:
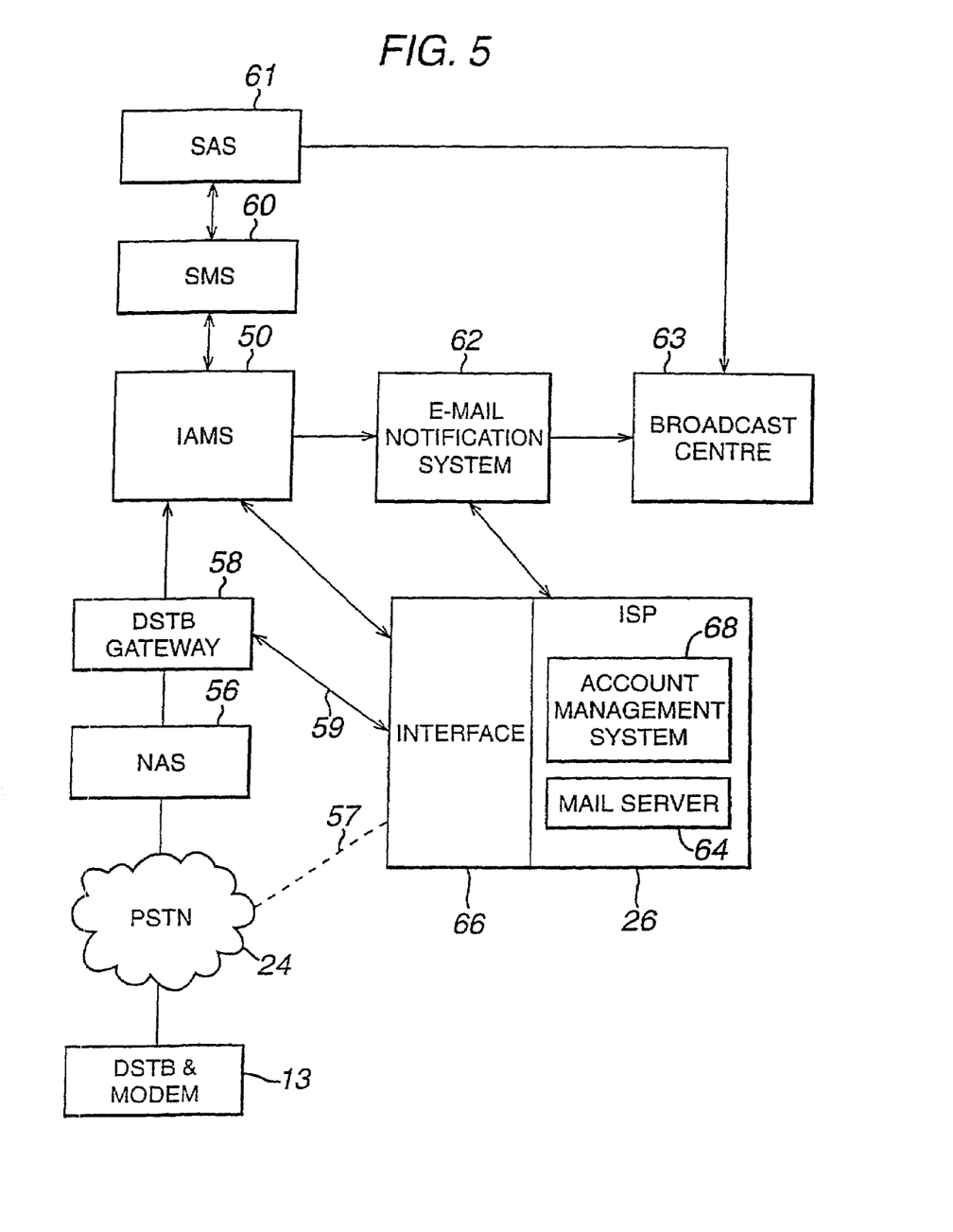
FIG. 5 shows the architecture of an internet access system.

The architecture of the internet access system is shown in FIG. 5. Referring to FIG. 5, internet account management system (IAMS) 50 is linked to internet service provider (ISP) 26 which provides services such as web browsing and e-mail. The IAMS 50 is also linked to subscriber management system (SMS) 60 which manages subscribers and sends requests to the IAMS to grant or deny access to internet services. Receiver/decoder 13 is connected to the IAMS via an internal modem, the public switched telephone network (PSTN) 24, network access server (NAS) 56, and gateway 58.

The SMS is also connected to Subscription Authorisation System (SAS) 61, which manages authorisations and subscribers' orders for broadcast services, such as broadcast television services. The SMS runs the SAS and IAMS systems in parallel and ensures consistency between the two systems. Communication between the SMS and the SAS and IAMS takes place using a real time TCP/IP link using batch files.

Gateway 58 allows subscribers to access internet services in real time. Such services include mail services for sending and receiving mail and other services which may be provided by ISP 26, and provisioning services and reminder services, which are provided by the IAMS. Functionally, the gateway 58 is a message router that enables communication with various different systems in a single modem connection. Where the receiver/decoder is not equipped with TCP/IP protocols for communicating with the ISP, the gateway also provides the necessary protocols for the receiver/decoder to communicate with the ISP. The receiver/decoder 13 then communicates with the ISP via gateway 58, as indicated by line 59 in FIG. 5. Where the receiver/decoder is equipped with the necessary protocols, communication can take place with the ISP directly, as indicated by dashed line 57 in FIG. 5. The gateway comprises a communication server and an e-mail dispatcher.

ISP interface 66 allows each modification related to a user's account which takes place in the IAMS to be duplicated to a user account in ISP 26 in charge of hosting internet services, such as mail services. It should be noted that all information relating to subscriber accounts is centralised in the IAMS, which ensures the management of TV and internet parameters. The IAMS also manages the relationship between the internet parameters and TV parameters, through its interface with Subscriber Management System (SMS) 60. SMS 60 manages subscribers and sends requests to the LAMS in order to grant or to deny access to internet services by subscribers.

In order to set up an IAMS account, a subscriber first sends a request for a new account, together with information such as requested e-mail address and selected options, from the receiver/decoder 13 to the IAMS 50. The LAMS checks the smartcard number of the subscriber against a list of smartcard numbers, obtained from subscriber management system (SMS) 60, corresponding to subscribers for which it may set up internet accounts. The IAMS then sends a request to the ISP to set up an internet account. Once the account has been set up, the ISP returns an acknowledgement to the IAMS, together with a password. The password is initially defined by the SMS, but may be modified later by the subscriber. The IAMS account information (password, e-mail address and internet parameters), is stored in the IAMS, along with the smartcard number of the subscriber. The IAMS informs the subscriber that his account has been set up. The subscriber can then send and receive mail to and from the mail server 28.

Figure 6:
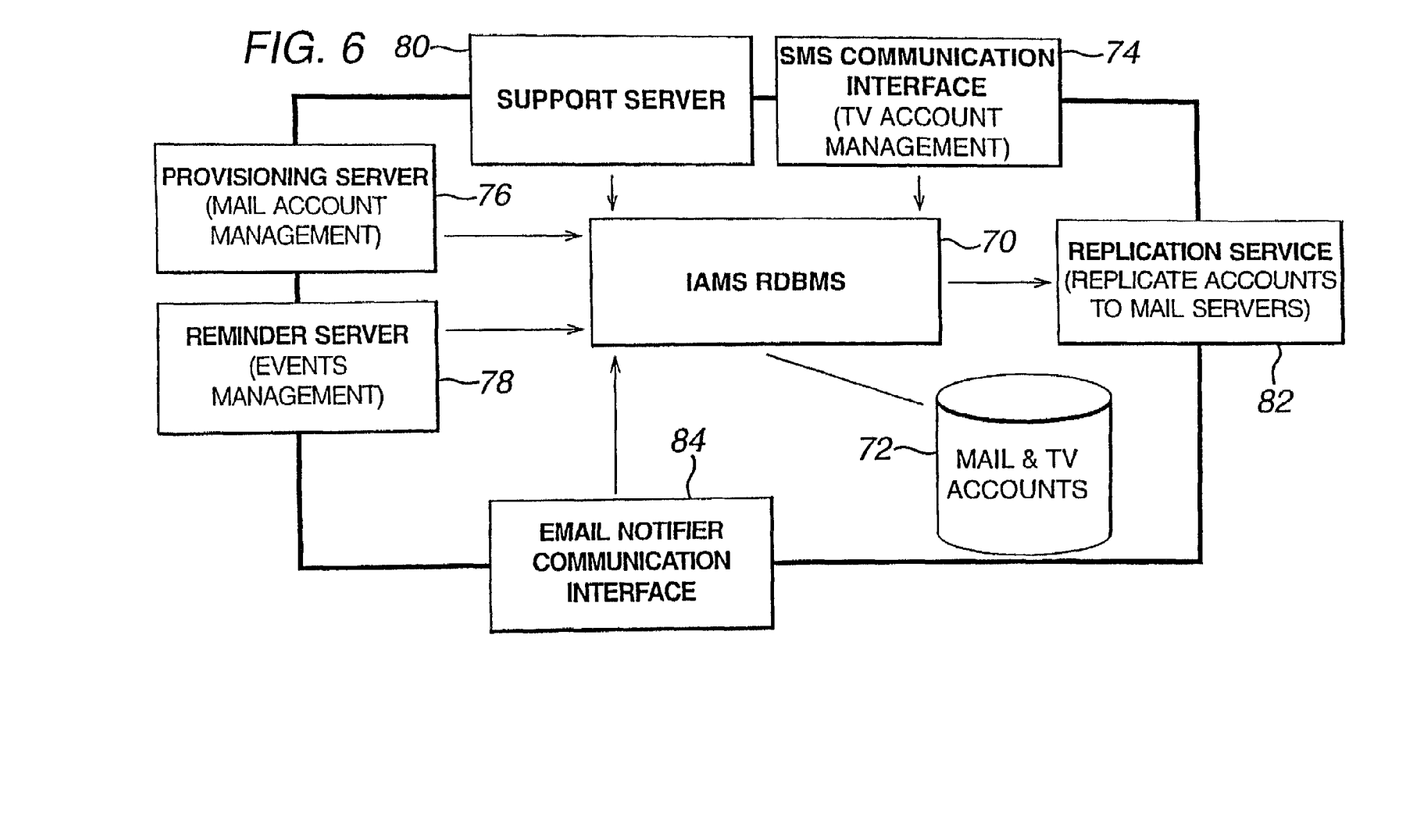
FIG. 6 shows the main components of an internet account management system.

The main components of the IAMS are shown in FIG. 6. The main functions of the IAMS are as follows:
- maintaining a centralised list of e-mail account parameters linked to subscriber parameters such as smartcard number
- granting or denying access to internet services for a subscriber at the request of the SMS
- customising internet accounts at the request of subscribers (provisioning)
- reminder service, which allows an e-mail user to register an event and to be warned by an e-mail at the time of the event
- duplication service, which allows updates of the IAMS contents to be copied to a related server, such as an ISP Central to the IAMS is a relational database management system (RDBMS) 70, which contains subscription information for internet services and e-mail accounts, stored in storage means 72. SMS communication interface 74 allows the IAMS to communicate with the SMS, so that the LAMS may be updated with the details of subscribers who have been granted or denied access to mail services. Provisioning server 76 allows a subscriber to manage and customise his e-mail account. Reminder server 78 allows a subscriber to manage a list of events. An event is related to a subscriber's e-mail account. A subscriber may register an event and receive an automatic reminder a predetermined number of days before the event via an automatically generated e-mail. E-mail notification interface 84 allows the EMNS 62 to search for a subscriber's notification preferences in the IAMS RDBMS 70 in order to send an over air notification message. Support server 80 allows an administrator to check the presence and the status of a subscriber or an e-mail user in the IAMS. Replication service 82 copies updates of the contents of the IAMS RDBMS 70 to the ISP account management system.

Requests which are sent to the IAMS from receiver/decoder 13 are directed to the appropriate part of the IAMS, such as the provisioning server (for e-mail account management) and the reminder server (to manage reminder events), by the gateway 58.

The internet access system described above allows broadcast service providers also to provide internet services. The operator of the system maintains internet accounts independently of internet service providers, so that the operator is not tied to a particular internet service provider. By linking together subscriptions to broadcast services and subscriptions to the internet, accounts for the two services may be managed together which may reduce the amount of processing involved, in comparison to the case where accounts are managed separately, and the subscriber may be billed together for the two services.

Further details of the IAMS are described in co-pending patent application entitled "Internet Subscriber Management" in the name of the present applicant, the subject matter of which is incorporated herein by reference. Further details of the e-mail notification system are described in co-pending patent application entitled "Method and Apparatus for use with E-mail" in the name of the present applicant, the subject matter of which is incorporated herein by reference.

Figure 7:
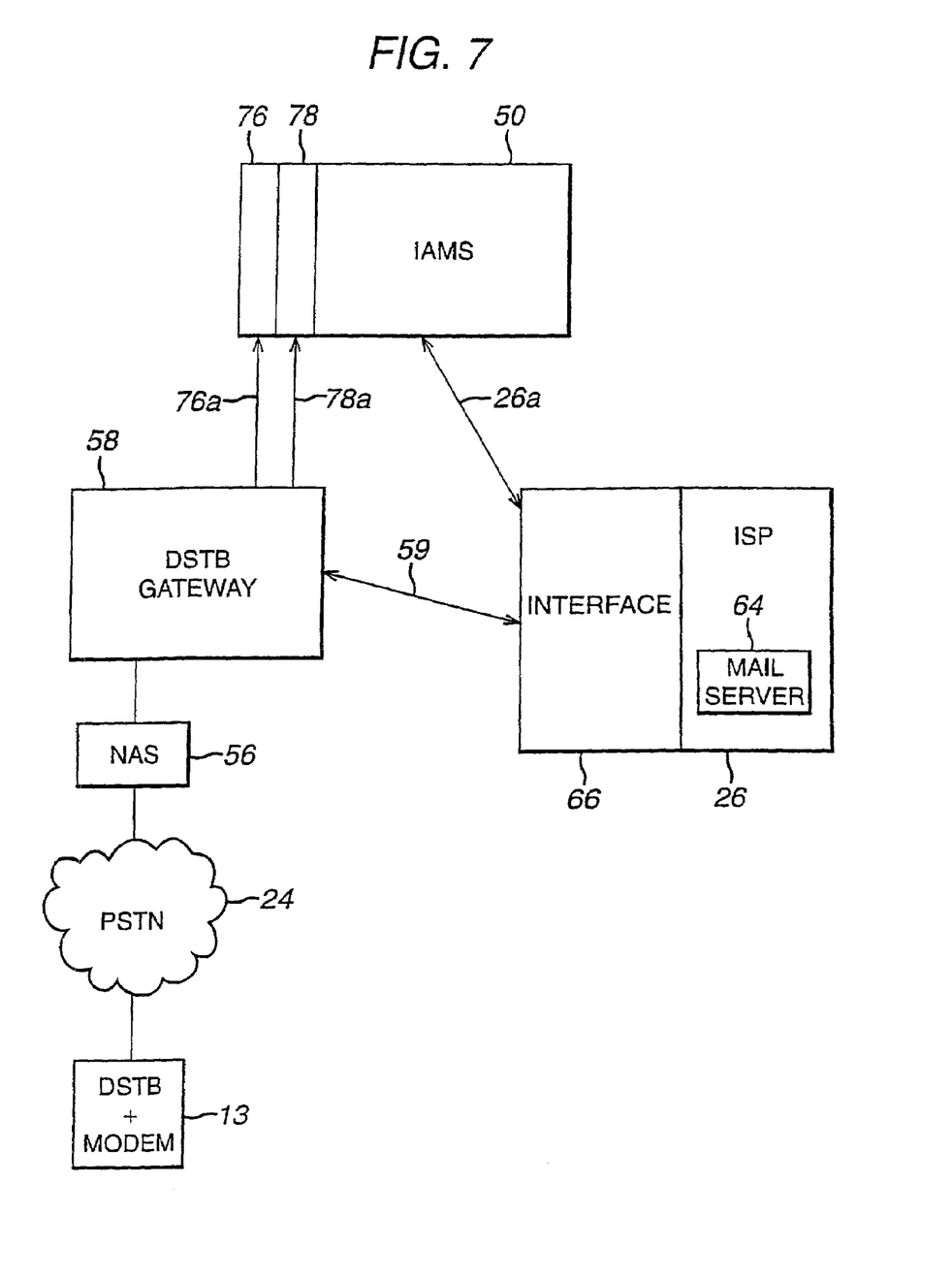
FIG. 7 shows a part of the configuration of the internet access system in the case where the receiver/decoder is not IP enabled.

A configuration of the internet access system in the case where the receiver decoder 13 is not internet enabled will now be described with reference to FIGS. 7 to 10. Referring to FIG. 7, which shows a portion of the system shown in its entirety in FIG. 5 but with certain aspects delineated in greater detail, receiver/decoder 13 is of the type previously described in which the unit is not equipped with the transport control protocol/internet protocol (TCP/IP) necessary for direct communication with the ISP 26. Communication, therefore, takes place via DSTB Gateway 58. The Provisioning server 76 and Reminding server 78 are shown in the figure as distinct portions of the IAMS 50 and, in the embodiment, data is routed to each via separate lines 76a and 78a as appropriate.

It will be appreciated, therefore, that there are in effect four subsystems of interest in any communication between the receiver/decoder 13 and any remote server desired to be accessed. These are the receiver/decoder 13 itself, the NAS 56, the Gateway 58 and the remote server which in the embodiment may be any one of provisioning server 76, reminding server 78 or mail server 64. The PSTN 24 is effectively data transparent. In the embodiment mail server 64 is accessed via interface 66 and the ISP 26 but this need not be the case and the mail server 64 could be directly accessed from the Gateway 58. Moreover, although shown as a single unit in the figure, the mail server 64 may consist of two separate units, a first for sending emails (which may be for example a SMTP server) and a second for receiving emails (which may be for example a IMAP server). In such an configuration, the Gateway 58 may communicate with the two units which comprise the mail server via two separate ports.

Figure 8:
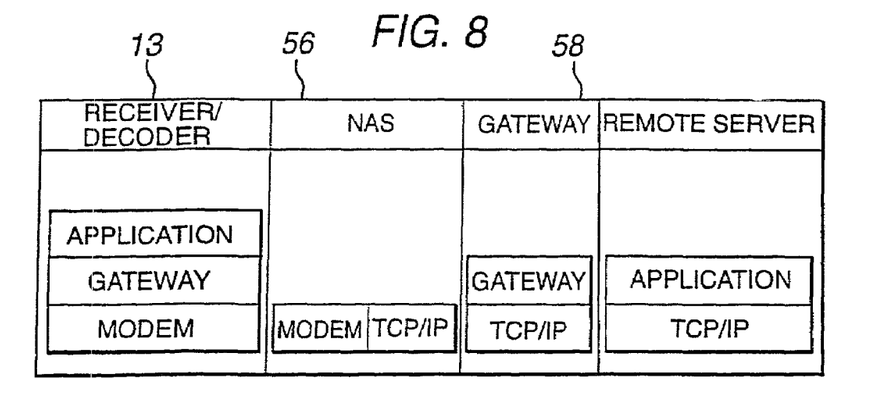
FIG. 8 illustrates protocol layers of the system shown in FIG. 7.

The different protocol levels handled by each of the four above described sub-systems will now be described with reference to FIG. 8. As will be seen from the figure, the receiver/decoder 13 has four protocol levels as follows (highest level first): an application level protocol (which will be application dependent) and may, for example, be SMTP, IMAP or the like; a Gateway protocol (this being the level used for the receiver/decoder—Gateway communication as will be more fully described below); a PP4 protocol and a modem layer such as v22 or v42 bis. The operation of these latter two layers will be well known to the skilled person.

The NAS 56 functions at a single protocol layer and is effective to convert the modem layer (used to communicate across the PSTN 24) to internet protocol TCP/IP.

The Gateway 58 has three operative protocol layers (again highest first), namely the Gateway protocol layer, the PP4 protocol layer and TCP/IP.

Finally the remote server will generally have two protocol layers an upper layer at the application level protocol and a lower layer at TCP/IP protocol.

The Gateway protocol therefore allows the Gateway 58 to respond to messages and in appropriate cases identify the intended recipient of data and forward the data to that recipient. The protocol also allows the receiver/decoder 13 to initiate various Gateway 58/remote server operations. In the embodiment, the Gateway 58 is responsible for directing SMTP or IMAP data to the mail server 64; directing data to provisioning server 76 which may include requests to provide for the creation of new accounts; directing data to the reminder server 78 which may include requests for event registration; constructing messages to be sent to the receiver/decoder 13 on the basis of data received from any one of the mail server 64, the provisioning server 76 or the reminder server 78 and handling the communication of such constructed messages. In addition the Gateway has the ability to perform a receiver/decoder authentication function.

The low level communication between the receiver/decoder 13 and the Gateway 58 will now be described. As a first step, modem communication is established between the receiver/decoder 13 and the NAS 56 over PSTN 24. Any suitable modem format may be used, for example v22 or v42bis. At this time a "chat" sequence occurs at the modem level between the receiver/decoder 13 and the NAS 56 so as fully to establish the communications channel. Thereafter the NAS 56 establishes a connection channel with the Gateway 58 at the TCP protocol level. Following this event, a token is sent by the Gateway 58 to the receiver/decoder 13, this token being a pre-specified character sequence. The receipt of such a token by the receiver/decoder 13 notifies it of the presence of the Gateway 58 and a communications channel between the receiver/decoder 13 and the Gateway 58 at the gateway protocol level is thereby established.

The established gateway protocol communications channel is, in effect, under the control of the receiver/decoder 13. It is the receiver/decoder which must request the channel before message exchange can occur. Additionally the disconnection procedure (described below) is instigated by the receiver/decoder 13 in order to close the channel.

It should be noted that, in this embodiment, the gateway protocol allows the establishment of a single TCP channel with a corresponding remote server. In other words, in this embodiment, the receiver/decoder 13 cannot be connected to more than one remote server at any one time. However, the receiver/decoder 13 may establish and release connection to different remote servers without needing to establish a fresh communications channel between it and the Gateway 58.

It should further be noted that, in the embodiment, the gateway protocol layer does not perform any error recovery function since the lower level protocols (modem/TCP) ensure the transport of data and the upper level protocols (application protocols) perform error handling.

The general message structure of communications in the Gateway protocol will now be described. Each message structure contains the following fields:

{protocol version} {command identifier} {data length} [parameters]

where { . . . } indicates mandatory fields and [ . . . ] optional fields.

The message structure is the same regardless of whether the message emanates from the receiver/decoder 13 or the Gateway 58. The fields are binary encoded with the most significant bit first.

The protocol version (PRT) field comprises a single byte identifying the protocol version.

The command identifier (CI) field comprises two bytes and identifies the type of message represented. The various types of message will become apparent from the data exchange events descriptions outlined below.

The data length (DL) field is two bytes in length and identifies the overall length of the appended parameters field (if any). This permits the parameter field to be of variable length. If there are no appended parameter fields, this field will contain a zero value.

The parameters field is encoded in TLV form (Type Length Value) and contains any necessary parameters associated with the message. There are three categories of parameter which may be used either individually or in combination dependent upon the type of message. In other words the type of message defines which of the parameter fields will be present. It will also be appreciated that certain messages (for example a message commanding that the connection be reset (MG_RCNX)) may not have an associated parameter.

The first type of parameter (REMOTE_SERVER) is used to identify the remote server and contains an integer indicative of whether the server identified is the STMP portion of the mail server 64, the IMAP portion of the mail server 64, the provisioning server 76 or the Reminder server 78. In the embodiment, this parameter is two bytes long. In a modification the parameter could be used to identify other or additional servers.

The second type of parameter (BODY) is used to contain data received from or to be sent to a remote server of interest. This parameter is of variable length as defined by the data length field hence meaning that the data packages need not be of pre-determined length. A maximum length of this parameter is predefined.

The third type of parameter (ERROR_CODE) is used to identify an error condition. This may be used to indicate, for example, when the Gateway is unable to open a connection with the specified remote server, when connection has been lost with the remote server, when a error is detected in a message received from the receiver/decoder 13, when no data has been received from a remote server following a command from the receiver/decoder 13 or when authentication has failed. In the embodiment, this parameter is two bytes in length.

In a modification, there may be a fourth type of parameter used to contain authentication details.

Figure 9:
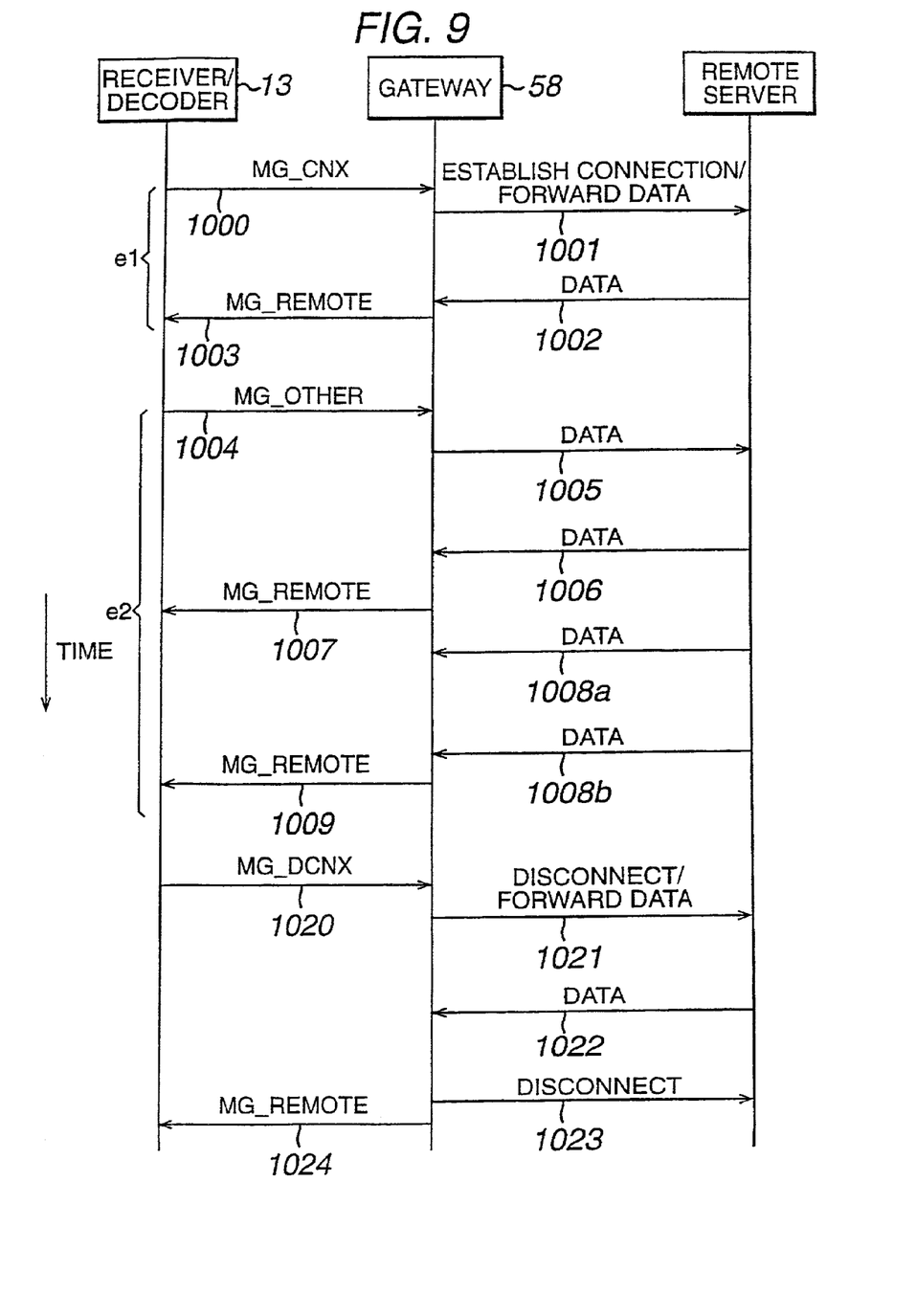
FIG. 9 diagrammatically illustrates the protocol adopted for communication between the user equipment and the gateway in the system of FIG. 7.

A typical data exchange sequence representative of normal dialogue over the Gateway protocol level communications channel will now be described with reference to FIG. 9. This shows diagrammatically the messages between the receiver/decoder 13 and the Gateway 58 together with the corresponding events occurring between the Gateway 58 and a selected remote server over a time period (time increasing down the page).

The first event series (e1) shown is the gateway protocol level connection procedure between the receiver/decoder and the specified remote server. The receiver/decoder 13 sends a message 1000 requesting connection (MG_CNX) containing two parameters, a REMOTE_SERVER parameter specifying the server to which it desires to conduct a dialogue and a BODY parameter which encapsulates data addressed to the remote server (if any). This causes the Gateway to perform two tasks collectively designated connection 1001 on the Figure, namely to establish connection with the specified server via the appropriate link and send via that link to the specified server the data (if any) contained in the message BODY parameter.

Following the above sequence, the remote server sends data 1002 to the Gateway 58 for onward transmission to the receiver/decoder 13. The Gateway encodes this in a "data exchange with remote server" (MG_REMOTE) message 1003, having a single parameter field, namely BODY which contains this data and sends the message to the receiver/decoder 13. A connection is thereby established.

The second event series (e2) shown is a typical data exchange sequence. The sequence commences with the sending by the receiver/decoder 13 of a "data exchange with remote server" (MG_OTHER) message which contains data destined for the server in the field parameter BODY. As will be appreciated, the receiver/decoder 13 only communicates with one remote server at any one time and hence as the server will have been already specified by the connection message (e2), it does not require to be specified during ordinary data exchange. The receipt of this data exchange message 1004 by the Gateway 58 causes it to pass the data therein to the remote server in the communication designated 1005.

The remote server may, thereafter, send data to the receiver/decoder (designated 1006, 1007) as previously described.

A further feature of the embodiment will now be described with reference to the communications designated 1008a, 1008b and 1009. The "data exchange with remote server" (MG_REMOTE) message of the type sent from the Gateway 58 to the receiver/decoder 13 includes a minimum data packet size. The Gateway 58 will not, therefore, send a message to the receiver/decoder 13 until a pre-determined minimum amount of data has been received from the remote server (in effect a minimum data amount threshold) or until a predetermined time has elapsed from the receipt of the last data from the remote server (in effect a time out). Thus although communication 1008a represents data transfer from the remote server to the gateway 58, the quantity of this data is lower than the predetermined threshold and hence no message is sent to the receiver/decoder 13 at this time. Next a further data transfer 1008b between the occurs from the remote server to the Gateway 58. This transfer results in sufficient data being communicated to the Gateway and hence it sends a data exchange message 1009 which includes both data sequences 1008a, 1008b. In a similar manner, once the quantity of data received by the Gateway 58 from the remote server exceeds a maximum amount, a data exchange message is sent to the receiver/decoder 13. In such an event, a single data exchange sequence between the remote server and the Gateway 58 may result in plural messages between the Gateway 58 and the receiver/decoder 13.

In the embodiment the timeout period is 200 milliseconds (ms), the minimum data received threshold is 128 bytes and the maximum data received threshold is 512 bytes.

Although not shown in the figure, it may arise that the Gateway 58 receives no data from the remote server within a pre-determined timeout period which, in the embodiment, is 5 seconds. In such an event, the Gateway sends an "error detected by Gateway" (MG_ERROR) message to the receiver/decoder 13 which includes a parameter field of the ERROR_CODE type, the contents of this field specifying the occurrence of such an event. The receiver/decoder 13 is responsible for whatever further action it would like to take which may include the sending of a "reset communication" (MG_RCNX) message which causes the Gateway 58 to close the TCP connection with the remote server.

As foreshadowed above, similar error messages may follow other events such as an inability to open a connection with the remote server, a loss of connection with the remote server or an erroneous message from the remote server. In the latter case this may include the receipt of data from the remote server by the Gateway 58 of an unknown type, of incorrect length, of an inapplicable value or having an unknown protocol version.

Returning to FIG. 9, the event of disconnection from the remote server (e3) will now be described. This event is initiated by the receiver/decoder 13 sending a "disconnect" (MG_DCNX) message 1020. This message may include data to be passed to the remote server in a BODY parameter. This command and data 1021 is passed to the remote server and the Gateway 58 then waits for an acknowledgement and reply data 1022 if any. Subsequently, the Gateway 58 disconnects from the remote server (1023) and sends a message 1024 to the receiver/decoder 13 which includes the received data if any. Although not shown in the figure at the low protocol level, the receiver/decoder 13 may then close the connection at modem level. The Gateway 58 will thereafter be notified by the NAS 56 that the TCP connection is closed.

Figure 10:
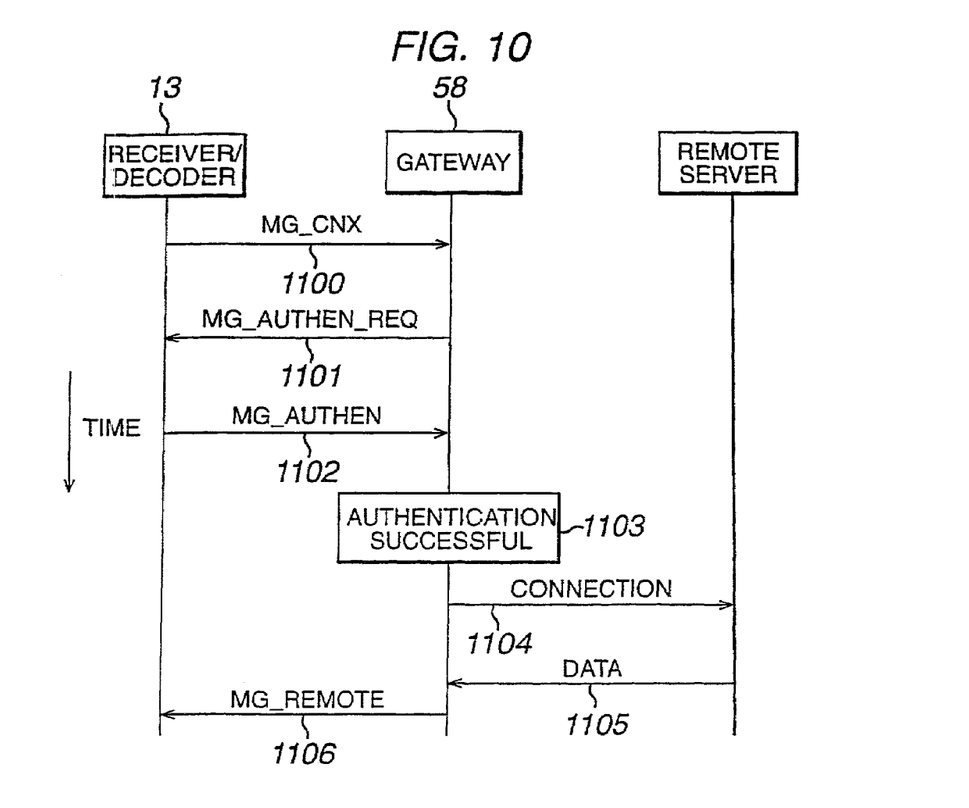
FIG. 10 diagrammatically illustrates the protocol adopted for authentication related communication between the user equipment and the gateway in the system of FIG. 7.

The authentication process provided for by the Gateway protocol will now be described with reference to FIG. 10. This may be required for various services, for example provisioning services, before establishment of a communications channel. The Gateway 58 contains information upon which servers require authentication prior to access and when it receives a "connection request" (MG_CNX) message 1100 for such a server it responds with an "authentication request" (MG_AUTHEB_REQ) message 1101. Such an authentication request message has no accompanying parameters. The receiver/decoder 13 must thereafter respond with an appropriate "authentication" message 1102. This message has an associated parameter which includes authentication data which may, for example, be the smartcard number, as more fully set out below. The authentication data may be passed in a BODY type parameter or, in a modification may have its own parameter type.

If the Gateway 58 adjudges the authentication details to be correct then the authentication is successful (indicated graphically be event 1103) and the Gateway 58 establishes a connection 1104 with the specified remote server. The Gateway 58 reports that the authentication is successful by sending a data exchange message 1106, which will include any data 1105 received from the remote server in response to the opening of the connection. In the case where authentication fails, an error message (MG_ERROR) is sent which includes a parameter indicating such a failure as previously outlined.

Returning to the system shown in FIG. 5, it is possible to identify two distinct types of "account" for the accessing of internet services and the like from receiver/decoder 13, namely a so-called "connection account" and a so-called "directory account". Within every connection account there may exist plural directory accounts.

A connection account provides the basis upon which a subscriber may access the operator network. A subscriber will be allocated a single connection account per operator although this may be associated with several connection protocols as more fully described below. The method by which authentication of such an account occurs is at the network level and will also be described in greater detail below.

The procedure upon user login by means of his connection account will now be described. As will be appreciated, the identification data supplied upon log-in must be unique in order to permit the user to be identified by the recipient. In the embodiment, this is achieved by the use of a so-called MSD number, which is at least partially derived from the smartcard number of the user's equipment. In addition, upon log-in, the user must specify the communications protocol which may vary in dependence upon, for example, whether the user is attempting access via a dial-up modem associated with a computer (which may use, for example, MediaWebPC a product of Canal+) or via the type of receiver/decoder unit such as that commonly referred to as a "set-top box". The protocols used may, for example, be PAP, CHAP or PPP for dial-up modem.

The login information includes, therefore, of the MSD number of the user, a field identifying the type of user terminal, a field specifying the type of data return to be utilised, a field indicating the client version number and, if applicable, the so-called RADIUS domain name of the client. The login will also include a password. In the embodiment, this information is formatted as follows:

login =

{msn_number} {terminal type} {return_type} {version} [@RADIUS_domain_name]

Each of the above fields will now be explained in fuller detail.

The msn_number field itself consists of the following string of fields:

{msn_number} = {RSMC} {RSMN} {chck}

The first of the MSN data fields contains the removable security module product code (RSMC) which identifies the type of smartcard. This identification of type may include data indicative of the one or more aspects of the technical make-up of the card, the manufacturer and the commercial operator who has provided the card to the user. In the embodiment, this field is of two bytes in length and may contain four digits.

The second of the MSN data fields contains the removable security module number (RSMN). This field includes a code which identifies a smartcard in use. Such code is preferably pre-programmed by the smartcard supplier and is unique to the smartcard and hence the user, thereby allowing identification of the user. In the embodiment this field is four bytes in length and may contain fifteen digits.

The final field contains check data (chck) which may be calculated by any known method, for example, it may be a checksum.

The terminal_type field will now be explained. As explained above, the terminal may be of the so-called "set-top" box variety or may be a computer having a modem facility. The field will take the value "P" for a PC type terminal and the value "T" for a set-top box terminal type. It will be appreciated that the field could, more precisely specify the terminal type and that the provision of such a field also permits future expansion by the definition of further and alternative terminal types.

The return_type field permits the specification of the method by which return data is sent to the user. In the embodiment, the field takes the value "M" when all return data is to be routed via the modem and the value "S" when data return is to take place over both satellite and modem channels. Again the possibility of future expansion in the methods of providing return data is provided for.

The version data field allows version data to be passed from the receiver/decoder 13 to the network. In the embodiment this is set at 01 as a default.

The optional field RADIUS_domain_name permits a client's authentication request to be routed to a third part authentication server which may permit the provision by such a third party of gateways to, for example, different service provider.

The connection profile will also contain a password field which, in the embodiment, has a maximum length of 14 alphanumeric characters.

Return now to describe the directory account this provides the basis for the accessing of individual internet services, for example proxy with identification, mail, news et cetera. A subscriber's directory accounts are linked to his connection account. In distinction, however, to a connection account, authentication of a directory account occurs at application level.

As previously stated, the directory account allows the access to divers internet services from the receiver/decoder 13. A directory account will generally consist of:

an identifier and password;

one or more so-called "e-mail aliases";

in appropriate cases, other data relating to the services offered to the subscriber.

The identifier (in appropriate cases in combination with the password) is used to control the access by the subscriber of various ISP services, for example access to the subscriber's mailbox. Other examples include access to private websites, directories, control of access to services, certificates, "mailgroup" registration and the like.

The identifier may also be used to receive e-mails address in the format "identifier@domain", in which event the subscriber may need to use his password when accessing the mailbox identified by the identifier.

The e-mail aliases provide for the facility of e-mail receipt by the e-mail server of messages address to "alias@domain".

In an embodiment, several directory accounts may be associated with a single connection account (so-called "family subscription"). In such an event, it may be possible for a user initially to specify the number of directory accounts which are permissible for each connection account, although it should be noted that each identifier and alias must be unique.

Terms

The following terms are used herein:

E-mail Address An E-mail address is composed of two fields: the E-mail ID and the domain name. The form of an e-mail Address is e-mail_Id@Domain_Name.

E-mail Account An E-mail Account provides information about the user that a Mail Server needs to process that user's messages.

E-mail Id The prefix of an e-mail address. An e-mail Id is unique in a domain name.

E-mail Notifier The e-mail Notifier System allows subscribers (EMN) to be notified as soon as they receive a new e-mail in their mailboxes. A short message is sent to their STB over-air.

Internet Account

Management System A system managing subscriber TV account Management parameters and related E-mail Accounts System (IAMS) parameters Mailbox Messages stored for IMAP delivery are held in a mailbox. A mailbox on a mail server must be uniquely identified by a mailbox Id. A mail server hosting different domain name can not consider that the e-mail Id is unique on the Mail server, so the mailbox Id must be the Email address.

Mail Server Program that exchanges e-mail with other Mail Servers and accepts and delivers messages to mail clients.

Message Queue

Server (MQS) A message management system.

Provisioning

Server Allows subscribers to create and customise e-mail accounts themselves.

Reminder Server Allows a user to register an event and receive an automatic reminder via an automatic mail.

Set Top Box The completely assembled, ready to use (STB) digital decoding hardware, manufactured in accordance with Digital Video Broadcasting standards, CANAL+ TECHNOLOGIES specifications. It is used as a digital decoder for transmitted video, audio, application and data streams so that the end user can access television programs and services.

SmartCard Cards that electronically store the secret keys of one or more commercial operators and other access information.

SmartCard Cards that electronically store the secret keys of one or more commercial operators and other access information.

Subscriber A subscriber is related to a TV account (i.e. a SmartCard number).

Subscriber Management

System (SMS) A system managing data relating to subscribers.

User A user is related to an e-mail account. There may be multiple users for a single subscriber.

The term "receiver/decoder" or "decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser or integrated with other devices such as a video recorder or a television.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of authenticating communication between a receiver/decoder and a remote device for providing access to a network, the method comprising:

authenticating the communication using an unique identifier that identifies the receiver/decoder, wherein the unique identifier is based on a subscription for broadcast services of the receiver/decoder;

wherein the receiver/decoder indirectly accesses the network to obtain internet services via a gateway interposed between the receiver/decoder and the remote device, and wherein the unique identifier authenticates the communication with the gateway, wherein low-level communication between the receiver/decoder and the gateway is performed using a message structure comprising a gateway protocol version a command identifier that identifies a type of the message, wherein the type of the message defines the at least one parameter included in the message, and a data length indicating an overall length of the least one parameter, wherein the at least one parameter identifies the remote device and comprises data to be communicated to the remote device for purposes of obtaining the internet services, wherein the internet services are associated with a subscription for access to internet services and wherein the broadcast services subscription and the internet services subscription are linked such that the broadcast and internet services subscriptions are managed together, wherein the linked internet and broadcast subscriptions are used to obtain both internet services and broadcast services, wherein the network is associated with corresponding network protocols, and data output from the receiver/decoder is converted into data compliant with the network protocols by the gateway interposed between the receiver/decoder and the remote device, and wherein the network comprises a plurality of remote devices, wherein said converted data is communicated by the gateway to one of the plurality of remote devices as specified in said data, wherein a communication channel is established between the receiver/decoder and the one of the plurality of remote devices.

2. The method according to claim 1, wherein the unique identifier is stored on a removable component of the receiver/decoder.

3. The method according to claim 1 wherein the unique identifier is independent of a network login identifier for the receiver/decoder.

4. The method according to claim 1, wherein the unique identifier is based on a number unique to a smartcard for use with the receiver/decoder.

5. The method according to claim 1, wherein the one of the plurality of remote devices is for accessing the internet.

6. The method according to claim 1, wherein the one of the plurality of remote devices is an internet account management system.

7. The method according to claim 6, wherein an internet account for a user is established by the internet account management system using the unique identifier of the receiver/decoder.

8. The method according to claim 7, wherein the unique identifier of the receiver/decoder is compared by the internet account management system with a stored list of identifiers of receiver/decoders which may establish internet accounts.

9. The method according to claim 7, wherein the one of the plurality of remote devices comprises means for sending data to an internet service provider and wherein said method comprises the steps of providing details of the internet account to the internet service provider to establish a bi-directional data pathway between the receiver/decoder and the internet service provider.

10. The method according to claim 1, wherein said unique identifier is accompanied by data identifying a data pathway to be used for communication between the receiver/decoder and one of the plurality of remote devices.

11. The method according to claim 1, wherein a message instructing termination of the communication channel is communicated from the receiver/decoder to the gateway using the non-internet protocol, the gateway in turn communicating a termination command to the specified remote device using the internet protocol.

12. The method according to claim 1, wherein the identification of the receiver/decoder is authenticated by the gateway before the communication channel is established.

13. The method according to claim 1, wherein the at least one parameter is at least one selected from the group consisting of a parameter that contains data received from the one of the plurality of remote devices, and a parameter that identifies an error condition.

14. The method according to claim 1, wherein the one of the plurality of remote devices requires authentication of the receiver/decoder, and wherein the gateway prompts the receiver/decoder for authenticate parameters to authenticate to the one of the plurality of remote devices.

15. The method according to claim 14, wherein the authentication parameters include a smartcard number.

16. The method of claim 14, wherein, upon authentication of the receiver/decoder, a subscriber using the receiver/decoder is permitted access to internet services via a connection account, wherein the connection account is an account used for subscriber log-in.

17. The method of claim 16, wherein the subscriber log-in is performed using a modified signed digit (MSD) number, wherein the MSD number is partially derived from the smartcard number.

18. The method of claim 16, wherein the connection account is linked to at least one directory account, wherein the at least one directory account provides the subscriber with access to internet services.

19. The method of claim 18, wherein the directory account comprises:

an identifier and a password;

at least one electronic mail aliases; and data related to internet services offered to the subscriber.

20. An apparatus for authenticating communication between a receiver/decoder and a remote device for providing access to a network, the apparatus comprising:

the receiver/decoder comprising an unique identifier that identifies the receiver/decoder and is based on a subscription to broadcast services of the receiver/decoder; and a gateway interposed between the receiver/decoder and the remote device configured to provide indirect access to the network to the receiver/decoder, wherein communication with the gateway is authenticated using the unique identifier associated with the subscription to broadcast services and wherein access to the network provides a subscriber with internet services, wherein low-level communication between the receiver/decoder and the gateway is performed using a message structure, and wherein the message structure comprises a gateway protocol version, a command identifier that identifies a type of the message, wherein the type of the message defines at least one parameter included in the message, and a data length indicating an overall length of the at least one parameter, wherein the at least one parameter identifies the remote device and comprises data to be communicated to the remote device for purposes of obtaining the internet services; and a subscriber management system configured to link the subscription to broadcast services with a subscription associated with the internet services to manage and provide both broadcast services and internet services to the subscriber, wherein the network is associated with corresponding network protocols, and data output from the receiver/decoder is converted into data compliant with the network protocols by the gateway interposed between the receiver/decoder and the remote device, and wherein the network comprises a plurality of remote devices, wherein said converted data is communicated by the gateway to one of the plurality of remote devices as specified in said data, wherein a communication channel is established between the receiver/decoder and the one of the plurality of remote devices.

21. The apparatus according to claim 20, wherein said unique identifier is accompanied by data identifying a data pathway to be used for communication between the receiver/decoder and the one of the plurality of remote devices.

22. The apparatus according to claim 20, wherein the at least one parameter is at least one selected from the group consisting of a parameter that contains data received from the one of the plurality of remote devices, and a parameter that identifies an error condition.

* * * * *

UNITED STATES PATENT AND TRADEMARK OFFICE
CERTIFICATE OF CORRECTION

PATENT NO.        : 7,360,078 B1                                          Page 1 of 1
APPLICATION NO.   : 10/019788
DATED             : April 15, 2008
INVENTOR(S)       : Gilles Lebouill It is certified that error appears in the above-identified patent and that said Letters Patent is hereby corrected as shown below:

On the Title Page Item (30) Foreign Application Priority Data, line 1, application number "99401680" should be --99401680.6--.

On the Title Page Item (30) Foreign Application Priority Data, line 2, application number "99401889" should be --99401889.3--.

On the Title Page Item (57) Abstract, line 3, the word "involves" should be --includes--.

Signed and Sealed this

Fifth Day of August, 2008

JON W. DUDAS
*Director of the United States Patent and Trademark Office*